(12) United States Patent
Virnelson et al.

(10) Patent No.: US 6,457,294 B1
(45) Date of Patent: Oct. 1, 2002

(54) INSULATING GLASS UNIT WITH STRUCTURAL PRIMARY SEALANT SYSTEM

(75) Inventors: Bruce Virnelson, Valencia; Richard Giangiordano, Oak Park, both of CA (US)

(73) Assignee: PRC-DeSoto International, Inc., Glendale, CA (US)

( * ) Notice: Subject to any disclaimer, the term of this patent is extended or adjusted under 35 U.S.C. 154(b) by 20 days.

(21) Appl. No.: 09/653,974

(22) Filed: Sep. 1, 2000

Related U.S. Application Data
(60) Provisional application No. 60/152,008, filed on Sep. 1, 1999.

(51) Int. Cl.[7] .................................................. E06B 3/66
(52) U.S. Cl. ...................................... 52/786.13; 52/172
(58) Field of Search .............................. 52/172, 786.13; 428/34; 156/107, 109

(56) References Cited

U.S. PATENT DOCUMENTS

| | | | |
|---|---|---|---|
| 3,919,023 A | 11/1975 | Bowser et al. | |
| 4,042,736 A | 8/1977 | Flint | |
| 4,193,236 A | 3/1980 | Mazzoni et al. | |
| 4,215,164 A | 7/1980 | Bowser | |
| 4,268,553 A | 5/1981 | Marzouki et al. | |
| 4,431,691 A | 2/1984 | Greenlee | |
| 4,464,874 A | 8/1984 | Shea et al. | |
| 4,587,289 A | 5/1986 | Comert et al. | |
| 4,806,590 A | * 2/1989 | Padgey et al. ............... | 524/568 |
| 4,807,419 A | 2/1989 | Hodek et al. | |
| 4,831,799 A | 5/1989 | Glover et al. | |
| 4,873,803 A | 10/1989 | Rundo | |
| 5,088,258 A | 2/1992 | Schield et al. | |
| 5,106,663 A | 4/1992 | Box | |
| 5,177,916 A | 1/1993 | Misera et al. | |
| 5,234,730 A | 8/1993 | Lautenschlaeger et al. | |
| 5,255,481 A | 10/1993 | Misera et al. | |
| 5,351,451 A | 10/1994 | Misera et al. | |
| 5,501,013 A | 3/1996 | Misera et al. | |
| 5,655,282 A | 8/1997 | Hodek et al. | |
| 5,675,944 A | 10/1997 | Kerr et al. | |
| 5,761,946 A | 6/1998 | Misera et al. | |
| 5,819,499 A | 10/1998 | Evason et al. | |
| 5,849,832 A | 12/1998 | Virnelson et al. | |
| 6,121,354 A | * 9/2000 | Chronister ................... | 524/262 |

FOREIGN PATENT DOCUMENTS

| | | |
|---|---|---|
| EP | 0 065 510 | 11/1992 |
| EP | 0 719 904 | 7/1996 |

\* cited by examiner

*Primary Examiner*—Michael Safavi
(74) *Attorney, Agent, or Firm*—Finnegan, Henderson, Farabow, Garrett & Dunner, L.L.P.

(57) ABSTRACT

An insulating glass unit including a first pane of glass, a second pane of glass, and a spacer system. The spacer system includes (i) a spacer positioned between an inner surface of the first pane of glass and an inner surface of the second pane of glass and (ii) a sealant system for adhering the inner surfaces of the glass panes to the spacer. The sealant system includes at least one sealant having (a) at least one thermoplastic hot-melt material having a melt temperature ranging from about 125° F. (51° C.) to about 250° F. (121° C.), and (b) at least one curable material. The sealant, when cured, forms a covalent bond between the spacer and the panes. The sealant has an initial hardness ranging from about 25 Shore A to about 450 Shore A and a post-cure hardness measured about 48 hours thereafter ranging from about 30 Shore A to about 50 Shore A.

3 Claims, 1 Drawing Sheet

INSULATING GLASS UNIT WITH STRUCTURAL PRIMARY SEALANT SYSTEM

CROSS-REFERENCE TO RELATED APPLICATION

This application claims the benefit of United States Provisional Application Serial No. 60/152,008 filed Sep. 1, 1999, which is herein incorporated by reference.

FIELD OF THE INVENTION

This application relates generally to insulating glass units and, more particularly, to an insulating glass unit having a dual-seal system that provides good protection against moisture vapor permeability as well as improved structural integrity.

TECHNICAL CONSIDERATIONS

Insulating glass (IG) units are used in a wide variety of applications, such as skylights, high temperature environment viewing windows, and architectural windows, just to name a few. IG units are typically utilized to reduce heat transfer, such as between the inside and outside of a building.

A typical IG unit is formed by two glass sheets separated near their edges by a spacer to provide a chamber between the two glass sheets. This chamber is typically filled with a selected insulating atmosphere, such as argon, to enhance the insulating characteristics of the IG unit. A sealant system is used to bond the two glass sheets to the spacer. The sealant system is expected to provide sufficient structural strength to maintain the unity of the IG unit and also to provide sufficient protection against the insulating atmosphere leaking out of the chamber and/or moisture vapor in the ambient atmosphere outside the IG unit from moving into the chamber. Examples of conventional IG units are disclosed in U.S. Pat. Nos. 4,193,236; 4,464,874; 5,088,258; and 5,106,663; and European reference EP 65510, the disclosures of which are herein incorporated by reference.

The strength and performance of the IG unit depend heavily upon the sealant system and type of sealant used to secure the glass sheets to the spacer. The majority of sealants currently in use may be divided generally into two major types: (1) "structural sealants" and (2) "low moisture vapor transmission (MVT) rate sealants".

Structural sealants form a covalent chemical bond between the glass sheet and the spacer and promote the structural integrity of the IG unit. Examples of structural sealants include thermoset materials, such as polysulfides, polyurethanes, and silicone. These thermoset materials typically have a relatively high "modulus". As will be understood by one of ordinary skill in the IG unit art, the term "modulus" relates to the stress/strain relationship of a material, i.e., the force required to stretch or elongate a material a certain distance. The modulus is conventionally defined as the slope of the stress/strain curve for a material and may be calculated in accordance with ASTM D412. The higher the modulus value, the more force which is required to elongate or stretch the material, i.e., the stronger is the material. Polyurethane, polysulfide, and silicone thermoset materials typically have modulus values in the range of several hundred psi. While enhancing the structural integrity of the IG unit, structural sealants typically provide poor MVT characteristics, e.g., 10 g/m$^2$/day or greater (as measured in accordance with ASTM F1249), and also provide relatively high gas transmission rates. For example, polyurethane, polysulfide, and silicone materials typically have MVT rates in the range of about 15, 25, and 50 g/m$^2$/day, respectively. As a result, IG units made only with conventional structural sealants do not typically provide commercially acceptable MVT characteristics or gas retention properties.

On the other hand, low MVT sealants, which do not covalently bond to the glass sheets and/or the spacer, provide improved MVT characteristics, e.g., less than 10 g/m$^2$/day, and improved gas barrier capabilities compared to structural sealants but provide poorer structural integrity. Examples of low MVT sealants include thermoplastic materials, such as hot-melt materials, e.g., polyisobutylene (PIB). PIB materials typically have an MVT value of about 1.0 g/m$^2$/day or less.

Also, thermoplastic hot-melt sealants typically must be applied at temperatures exceeding 300° F. (149° C.). This high temperature requirement may result in increased manufacturing costs due to higher energy consumption and the need for specialized, high-temperature equipment. Additionally, these thermoplastic materials typically have a lower modulus than thermoset materials, i.e., the thermoplastic materials require less force to stretch or elongate and have a tendency cold-flow. For example, PIB has a modulus value of about 30 psi (2.1 kg/cm$^2$). Therefore, thermoplastic sealants are subject to softening when exposed to heat and, when placed under load, can flow or deform excessively to relieve the load. As a result, IG units made only with conventional thermoplastic sealants typically do not provide commercially acceptable structural characteristics.

A problem with using a single sealant for an IG unit having a conventional rigid spacer arises from the sealant thickness differences in the sealant system. For example, the thickness (width) of the sealant between the side of the spacer and the adjacent glass sheet (side region) is much less than the thickness of the sealant located between the glass sheets outside of the spacer (outer region). Therefore, if one of the glass sheets moves outwardly from the spacer, for example due to a change in atmospheric pressure, the relative percent of elongation for the thinner sealant portion in the side region is much larger than that for the thicker sealant portion in the outer region. This means that the thinner sealant portion in the side region is carrying practically all of the load of the sealant-system, which may cause this sealant portion to split or fail prematurely.

Recently, attempts have been made to develop "hybrid" sealants for single sealant IG units that have the low MVT characteristics of a thermoplastic material with the structural characteristics of a thermoset material. For example, U.S. Pat. No. 5,849,832 discloses a one component sealant combining a thermoplastic hot-melt resin blended with an atmospheric curing polymer. The MVT characteristics of this sealant, e.g., about 3.0–4.0 g/m$^2$/day, are better than the MVT characteristics of conventional thermoset sealants but are still higher than for thermoplastic sealants, such as PIB. Additionally, since this sealant provides the IG unit with structural integrity, it has a modulus of about 250 psi (17.5 kg/cm$^2$). Further, this material is harder than conventional thermoplastic materials, e.g., has an initial hardness greater than about 50 Shore A and a cured hardness of greater than about 60 Shore A (as measured in accordance with Sealed Insulating Glass Unit Manufacturers Association (SIGMA) test procedure P.1.A. using a Shore gauge (scale A) commercially available from the Shore Instrument Company). Therefore, this material does not completely overcome the drawbacks discussed above.

As an alternative to single sealant systems, so-called "dual-seal" systems were developed to combine the relative advantages of structural sealants and low MVT sealants. A conventional dual-seal system utilizes a low MVT thermoplastic inner or primary sealant located primarily on the side region of the spacer to reduce moisture vapor transmission into the chamber. This primary sealant provides little or no structural integrity to the IG unit. A secondary, outer structural thermoset sealant is located primarily on the outside of the spacer (outer region) to bond the spacer and glass sheets together to provide the IG unit with structural integrity.

However, even in these dual-seal systems, under normal use there is a natural tendency for the outside edges of the glass sheets to rotate or flex due to changes in atmospheric pressure, temperature, wind load, or altitude changes. Under these circumstances, the thermoplastic primary sealant tends to expand and contract and may pull away from the glass sheet and/or spacer. This may cause gaps in the sealant system through which moisture may enter the chamber or through which the insulating atmosphere may leak out of the chamber.

Therefore, it would be advantageous to provide a dual-seal system for an IG unit which provides low MVT characteristics but which also provides improved structural performance over conventional sealant systems. It would also be desirable if the primary sealant of the sealant system possessed a lower modulus value than conventional structural sealants or hybrid sealants to reduce the stress typically carried by primary sealants located on the side region of an IG unit.

SUMMARY OF THE INVENTION

An insulating glass unit of the invention comprises a first pane of glass, a second pane of glass, and a spacer system. The spacer system comprises (i) a spacer positioned between an inner surface of the first pane of glass and an inner surface of the second pane of glass and (ii) a sealant system for adhering the inner surfaces of the glass panes to the spacer. The sealant system comprises a sealant comprising (a) at least one thermoplastic hot-melt material having a melt temperature ranging from about 125° F. (52° C.) to about 250° F. (121° C.), and (b) at least one curable material. The sealant, when cured, forms a covalent bond between the spacer and the panes. The sealant has an initial hardness ranging from about 25 Shore A to about 45 Shore A and a post-cure hardness measured about 48 hours thereafter ranging from about 30 Shore A to about 50 Shore A.

Another insulating glass unit comprises a first pane having an inner surface and an outer surface and a second pane having an inner surface and an outer surface, with the panes positioned such that the inner surface of the first pane faces the inner surface of the second pane. A spacer is located between the first and second panes and a sealant system adheres the panes to the spacer. The sealant system comprises (a) a first sealant comprising a thermoplastic material and a curable material, and (b) a second sealant. The first sealant has a moisture vapor transmission rate of less than about 2.5 g/m$^2$/day and a hardness after curing ranging from about 30 Shore A to about 50 Shore A.

BRIEF DESCRIPTION OF THE DRAWING

The foregoing summary, as well as the following detailed description of the preferred embodiments, will be better understood when read in conjunction with the appended drawing, in which.

DESCRIPTION OF THE PREFERRED EMBODIMENTS

Figure 1:
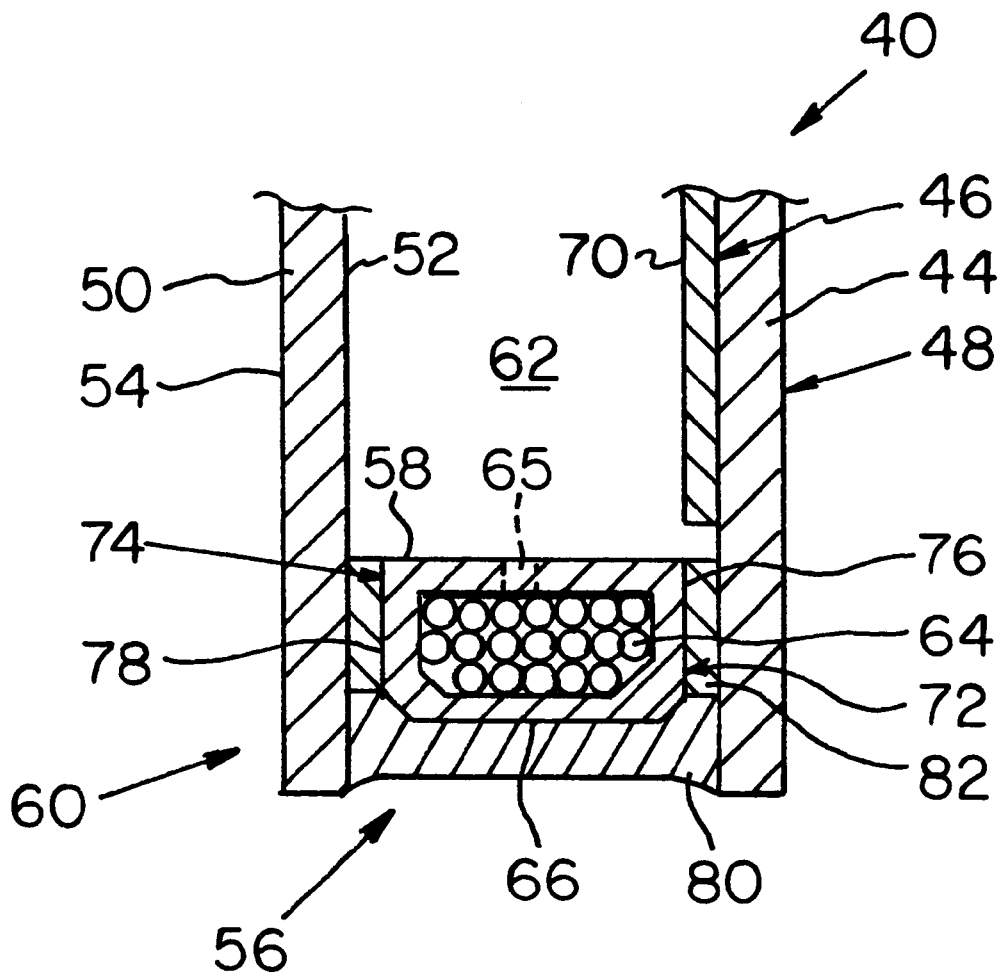
FIG. 1 is a cross-section of an elevational view of a portion of an edge assembly of an IG unit having a sealant system according to the invention.

As used herein, spatial or directional terms such as "inner", "outer", "left", "right", "back", and the like, shall relate to the invention as it is shown in the drawing figure. However, it is to be understood that the invention may assume various alternative orientations and step sequences without departing from the inventive concepts disclosed herein. Accordingly, such terms are not to be considered as limiting unless otherwise indicated. Further, other than in the operating examples, or where otherwise indicated, all numbers expressing quantities of ingredients, reaction conditions, and so forth used in the specification and claims are to be understood as being modified in all instances by the term "about". Additionally, any numeric references to amounts, unless otherwise specified, are "by weight". Moreover, all ranges disclosed herein are to be understood to encompass any and all subranges subsumed therein. For example, a range of "1 to 10" includes any and all subranges between (and including) the minimum value of 1 and the maximum value of 10, that is, any and all subranges having a minimum value of equal to or greater than 1 and a maximum value of equal to or less than 10, e.g., 5.5 to 10.

An IG unit 40 according to the present invention is shown in FIG. 1. The IG unit 40 has a first pane 44 having an inner surface 46 and an outer surface 48. The first pane 44 is spaced from a second pane 50, which also has an inner surface 52 and an outer surface 54. The two panes 44 and 50 may be of any material conventionally used in the IG unit art. For example but not to be considered as limiting, the two panes 44 and 50 may be clear glass, e.g., clear float glass, or one or both of the panes can be colored glass. The glass can be annealed, tempered, or heat strengthened glass and can be uncoated or coated glass.

The inner surface 46 of the first pane 44 faces the inner surface 52 of the second pane 50, and the inner surfaces 46 and 52 are spaced apart by a spacer system 56 having a spacer 58 which is attached, e.g., adhesively bonded, to the two panes 44 and 50 by a sealant system 60 having at least one sealant. The spacer 58 may be any of the type used in the IG unit art, such as a conventional rigid or box-type spacer, a U-shaped spacer, or a flexible spacer. Such spacers are typically formed of metal, such as aluminum or 201 or 304 stainless steel, and bent or shaped into a conventional spacer shape. Examples of suitable spacers are disclosed, for example but not to be considered as limiting, in U.S. Pat. Nos. 4,193,236; 4,464,874; 5,088,258; 5,655,282; 5,675,944; 5,177,916; 5,255,481; 5,351,451; 5,501,013; and 5,761,946, which are herein incorporated by reference. In the illustrative embodiment shown in FIG. 1 but not to be considered as limiting to the invention, the spacer 58 is depicted as a box-type spacer having a base 66 with a first side 72 and a second side 74 extending from the base 66. Each side 72, 74 includes an outer surface 76, 78 facing the inner surfaces 46, 52 of the respective adjacent panes 44, 50.

The two panes 44 and 50 and spacer system 56 define a chamber 62 or "dead space" between the two panes 44 and 50. The chamber 62 can be filled with an insulating atmosphere, such as air or argon or krypton gas. A conventional desiccant material 64 as is known in the art may be located within the spacer 58, e.g., the desiccant material may be loose or may be adhesively bonded to one of the inner surfaces of the spacer 58 in any conventional manner. The spacer 58 preferably includes channels or holes 65 through which the desiccant material 64 is in contact with the insulating gas in the chamber 62.

A coating 70, such as a solar control, e.g., low emissivity, or photocatalytic coating, may be applied in any conventional manner, such as MSVD, CVD, pyrrolysis, sol-gel, etc., to a surface, e.g., an inner surface, of one or more of the panes 44 and 50.

Although the sealant composition of the invention can be used in a single seal system, in a preferred embodiment of the present invention the sealant system 60 is a "dual-seal" system having two separate or distinct sealant regions, i.e., an outer or secondary sealant 80 and an inner or primary sealant 82, with a sealant composition of the invention used to form the primary sealant 82.

The primary sealant 82 is located principally in the side regions of the spacer 58, i.e., the majority of the sealant is located between a side of the spacer 58 and the adjacent pane 44 or 50. However, unlike conventional primary sealants which provide low MVT characteristics but little or no structural integrity, the primary sealant 82 of the invention covalently bonds to the panes 44 and 50 and the spacer 58 to provide the IG unit 40 not only with good structural integrity but also to provide a low moisture vapor transmission rate which is generally comparable to that of conventional thermoplastic primary sealants, such as PIB.

Preferably, the primary sealant 82 has a moisture vapor transmission rate of less than 10 $g/m^2/day$, preferably less than 5 $g/m^2/day$, more preferably less than 3 $g/m^2/day$, and most preferably less than 2 $g/m^2/day$.

The primary sealant 82 preferably has a lower cured modulus value than the secondary sealant 80 to reduce the strain on the primary sealant 82 caused when the IG unit 40 flexes. Preferably, the primary sealant 82 has a cured modulus value of less than 200 psi (14 $kg/cm^2$), preferably less than 150 psi (10.5 $kg/cm^2$), and more preferably about 35 psi (2.5 $kg/cm^2$) to about 120 psi (8.4 $kg/cm^2$).

As will be described more specifically in the Examples below, the primary sealant 82 of the present invention is formed from a sealant composition comprising a thermoplastic hot-melt material and a curable material.

The hot-melt material may comprise a single hot-melt material or may be a mixture of several chemically different hot-melt materials. The hot-melt material may comprise one or more polyolefins, such as polyethylenes, or may comprise polyvinyl acetates, polyamides, hydrocarbon resins, asphalts, bitumens, waxes, paraffins, crude rubbers, fluorinated rubbers, polyvinyl chloride, polyamides, fluorocarbons, polystyrene, polypropylenes, cellulosic resins, acrylic resins, thermoplastic elastomers, styrene butadiene resins, ethylene propylene terpolymers prepared from ethylene propylene diene monomer, polyterpenes, and mixtures thereof. For example, in one exemplary embodiment, the thermoplastic hot-melt material can comprise a mixture of solid chlorinated paraffin and an epoxidized soya oil. In an alternative exemplary embodiment, the hot-melt material can comprise a mixture of solid chlorinated paraffin and polyisobutylene. In a currently preferred embodiment, the hot-melt material comprises a mixture of an epoxidized soya plasticizer, ethylene butylacrylate (EBA), and a polyolefin material.

Preferably, the thermoplastic hot-melt material of the primary sealant composition is present in an amount of about 10 weight percent to about 90 weight percent, more preferably about 20 weight percent to about 70 weight percent, even more preferably about 25 weight percent to about 65 weight percent, and most preferably about 25 weight percent to about 35 weight percent, based on the total weight of the primary sealant composition.

The primary sealant comprises at least one curable material, which curable material can be a radiant energy curable material, such as an IR or UV curable material, a heat curable material, or an atmospheric curable material, such as a polymeric material which crosslinks upon exposure to a constituent of the ambient atmosphere, such as oxygen or water vapor. The curable material can comprise one or more moisture curable polysulfides, polydimethylsiloxanes, oxygen curable polysulfides, and mixtures thereof, which may contain silicon functionalities. Suitable curable materials for the practice of the invention include alkoxy, acetoxy, oxyamino silane terminated polyethers and polyether urethanes; alkyl siloxane polymers crosslinked with alkoxy, acetoxy, oxyamino organo functional silanes; moisture curable isocyanate functional polyoxyalkalene polymers and polyalkalene polymers; thiol functional polymers and oligomers (such as polyethers, polyether urethanes, polysulfides, polythioethers), suitably catalyzed to produce moisture curable systems; epoxide functional polymers and oligomers with moisture deblockable crosslinkers; acrylic functional polymers with deblockable crosslinkers, UV curable acrylic polymers, and mixtures thereof. Most preferably, the curable material comprises one or more alkoxy silane terminated polyurethanes, alkoxy silane terminated polyethers, polydimethylsiloxane polymers, organo functional silanes, and mixtures thereof. In a currently preferred embodiment, the curable material comprises one or more moisture curable polyurethanes, such as PERMAPOL MS® polyurethane, commercially available from PRC DeSoto of Glendale, Calif.

The curable material of the primary sealant composition is preferably present in the composition in an amount of about 5 weight percent to about 50 weight percent, preferably about 10 weight percent to about 40 weight percent, more preferably about 10 weight percent to about 28 weight percent, and most preferably about 10 weight percent to about 15 weight percent, based on the total weight of the sealant composition.

Additionally, in a currently preferred embodiment, the primary sealant composition also includes a tackifier, such as wood rosin ester, to provide adhesion upon initial application of the composition and before covalent bonding occurs. Examples of other suitable tackifiers include hydrocarbon resins, terpene phenolic resins, and alpha methyl styrene resins. The tackifier may be present in any suitable amount, for example but not to be considered as limiting, about 5 weight percent to about 50 weight percent based on the total weight of the sealant composition.

As discussed above, the primary sealant composition of the invention may further comprise a catalyst, such as an organic catalyst. The specific organic catalyst and the amount used will depend upon the particular curable material which is used. Suitable catalysts include organo tin compounds, aliphatic titanates (having from 1–12 carbon atoms) such as lower alkyl titanates, and amines. Suitable catalysts include dibutyltin dilaurate, dibutyltin diacetate, tetrabutyl titanate, and tetraethyl titanate. Although the sealant composition of the invention will cure without the addition of the catalyst, the addition of a catalyst can provide for faster curing times, which-may be advantageous in certain situations.

Likewise, an accelerator can be added to further increase cure rates. The specific accelerator will be dictated by the identity and concentration of the catalyst and chosen from those common to the art. Examples of suitable accelerators include blocked amines, such as bis-oxazoladine, commercially available as "HARDNER OZ" from Bayer, Inc.

The sealant composition may include catalysts, accelerators, plasticizers, fillers, pigments, weatherability improvers, and similar components as are known in the art. It may also be desirable, in some instances, to add additional fillers, such as talc, calcium carbonate, silicas, and silicates, pigments, Theological agents and like such as are known in the art. Strength properties in the sealant depend on the type and quantity of the hot-melt material, and also the filler selection. The fillers may be selected by one of skill in the art and added in an amount sufficient to impart the appropriate strength, as well as to impart desirable application properties to the sealant composition. The primary sealant composition of the present invention should be easy to handle and apply to the IG unit.

The thermoplastic hot-melt material, curable material, and any optional components are preferably combined to form a single primary sealant material. By "single material" is meant that on a macroscopic scale the sealant comprises a substantially homogeneous mixture; however, it may have compositional variations on a microscopic scale.

In an alternate embodiment, the thermoplastic hot-melt material and the curable material can be the same. One preferred formulation comprises high molecular weight silicon-terminated urethane prepolymers. Another formulation comprises silicon-functionalized Kraton polymers (block copolymers, commercially available from Shell Chemical Company). Kraton polymers are block copolymers of several types such as SBS (styrene-butadiene-styrene), SIS (styrene-isoprene-styrene), and SEBS (styrene-ethylene/butylene-styrene). Yet another formulation comprises Kraton polymers with other functional groups which provide for rapid solidification upon cooling, followed by chemical cure upon exposure to atmospheric conditions.

The secondary sealant 80 is preferably a conventional structural sealant, such as a conventional thermoset sealant material. For example, the secondary sealant 80 can comprise one or more conventional silicone, polyurethane, or polysulfide structural sealant materials as are known in the art. Examples of suitable secondary sealant materials as disclosed, for example, in U.S. Pat. Nos. 4,193,236; 4,464,874; 5,088,258; and 5,106,663; and European reference EP 65510. Alternatively, PRC 590 sealant, commercially available from PRC DeSoto International, Inc. of Glendale, Calif., can be used as the secondary sealant 80. U.S. Pat. No. 5,849,832, herein incorporated by reference, also discloses a material suitable as a secondary sealant for the present invention. In a currently preferred embodiment, the secondary sealant 80 is a conventional silicone sealant material. As will be understood by one of ordinary skill in the art, the principle function of the secondary sealant 80 is to provide structural integrity to the IG unit 40. Therefore, the secondary sealant preferably has a modulus value of greater than about 75 psi (5.3 kg/cm$^2$), preferably greater than about 125 psi (8.8 kg/cm$^2$), and more preferably greater than about 200 psi (14 kg/cm$^2$) as measured in accordance with ASTM D412. As shown in FIG. 1, the secondary sealant 80 preferably extends across the width of the outside of the spacer 58 (outer region), e.g., extends across the perimeter groove formed by the outer surface of the base 66 of the spacer 58 and the outer marginal edges of the panes 44 and 50.

The sealants 80, 82 may be of any suitable dimensions to adhere the panes 44, 50 to the spacer 58. For example, the primary sealant 82 may have a thickness of about 3/32 inch (0.2 cm) to about 3/16 inch (0.5 cm) and the secondary sealant 80 may have a thickness of about 3/16 inch (0.5 cm) to about 1/4 inch (0.6 cm).

The method of fabricating an IG unit 40 incorporating a sealant system 60 of the invention will now be described. As will be appreciated, the IG unit 40 and spacer 58 may be fabricated in any conventional manner, such as but not limited to those taught in U.S. Pat. Nos. 4,807,439; 4,831,799; 4,431,691; 4,873,803; and 3,919,023, but modified as discussed below to include the sealant system 60 of the invention. For example, a substrate, such as a metal sheet having a thickness, length and width sufficient for producing a spacer of desired dimensions, may be formed by conventional rolling, bending or shaping techniques. Although the primary and secondary sealants 82, 80 may be positioned on the substrate before shaping, it is preferred that the primary and secondary sealants 82, 80 be applied after the spacer 58 is shaped. The primary and secondary sealants 82, 80 may be applied in any order onto the spacer 58. However, it is preferred that the primary sealant 82 be applied first and the secondary sealant 80 applied subsequently. For example, the primary sealant 82 may be applied to the outer sides 76, 78 of the spacer 58 by one set of nozzles and the secondary sealant 80 subsequently applied to the back or base 66 of the spacer 58 by a separate set of nozzles. The sealants 80, 82 may be applied to any desired thickness.

The IG unit 40 may then be assembled by positioning and adhering the panes 44 and 50 to the spacer 58 by the sealant system 60. An insulating gas, such as air or argon or krypton gas, may be introduced into the chamber 62 in any conventional manner.

The primary sealant 82 preferably is flowable or, more preferably is a high viscosity liquid, e.g., having a viscosity of about 50,000 poise, at a temperature above about 160° F. (71° C.) to about 170° F. (77° C.). The primary sealant 82 of the invention is preferably applied at an elevated temperature of approximately 125° F. (51° C.) to about 250° F. (121° C.) in the form of a high viscosity liquid or a paste, which then turns back to a solid upon cooling to a temperature of about 90° F. (32° C.) to about 100° F. 38° C.). The hot-melt material of the sealant functions as the meltable component during the initial application and supplies strength upon cooling. The curable material then begins to cure, e.g., by reaction with atmospheric moisture or heat, to form a cross-linked elastomer which resists deformation upon application of heat. After the curable material has cured, the hot-melt material functions as a plasticizer within the cured polymer phase.

The primary sealant 82 of the invention preferably has a precure initial hardness of between about 25 Shore A and 50 Shore A, preferably between about 25 Shore A and 45 Shore A. The cured primary sealant 82 has a hardness of between about 30 Shore A and 65 Shore A, preferably a hardness at about 48 hours after application between about 30 Shore A and about 50 Shore A or more.

A method of making the primary sealant of the invention will now be discussed. The primary sealant 82 of the present invention may be prepared in the following general manner, with more specific preparations described in the Examples below. The thermoplastic hot-melt material, or mixtures thereof, is first dispensed into a mixing vessel at an elevated temperature. In one preferred embodiment, the mixing vessel is a stainless steel vessel capable of carrying out mixing under a vacuum of about 20 Torr or lower and further includes a mixer having a variable speed, multi-shaft unit, with a low speed sweep blade, a high speed disperser, and a low speed auger. The filler material is then added to the hot-melt material and mixing begins at low speed. Thereafter, the curable material, or mixtures thereof, to which additional filler may have been added to form a curable composition, is added to the mixture subsequent to turning on the vacuum. At the point the curable material is preferably added, the mixing is conducted under vacuum so as to eliminate or reduce exposure of the mixture to atmospheric conditions, and also to remove residual water from the raw materials, thereby improving package stability. Small volume additives such as pigments, weatherability improvers such as UV absorbers and antioxidants and the like can be added before the introduction of the curable material, while any catalyst may be added after. The material is maintained under substantially dry conditions until such time as it is ready to be applied to the IG unit. In other preferred embodiments, the mixing may be carried out under a blanket of dry, inert gas. Specific exemplary non-limiting methods of making the primary sealant of the invention are disclosed in the Examples below.

As discussed above, any suitable structural sealant, such as a conventional silicone sealant material, can be used as the secondary sealant 80.

EXAMPLE 1

This Example illustrates, as set forth in Table 1, a suitable primary sealant composition of the invention and a method of making the primary sealant.

TABLE 1

| MATERIAL | CHARGE WEIGHT | % WEIGHT | PROCEDURE |
|---|---|---|---|
| 1. Chlorinated Plasticizer[1] | 164.0 lbs. (74 kg) | 8.2% | Charged. Mixed at low speed. |
| 2. Epoxidized Soya Oil[2] | 460.0 lbs. (207 kg) | 23.0% | Charged. |
| 3. Solid Chlorinated Paraffin[3] | 560.0 lbs. (252 kg) | 28.0% | Charged. Turned on disperser at medium speed. Continued mixing until the material was fluid. |
| 4. Carbon Black[4] | 48.0 lbs. (22 kg) | 2.4% | Charged one bag at a time. |
| 5. Talc[5] | 520.8 lbs. (234 kg) | 26.04% | Charged one bag at a time. Turned on vacuum. Mixed with low speed blades at low setting and dispersion at medium speed for 30 minutes. |
| 6. Atmospheric Curing Resin Composition[6] | 236.0 lbs. (106 kg) | 11.8% | Charged. Turned on vacuum. Mixed at low speed all blades for 15 minutes. Moisture content tested. |
| 7. Dibutyltin Dilaurate[7] | 2.0 lbs. (0.9 kg) | 0.1% | Charged. |
| 8. Accelerator[8] | 3.6 lbs. (1.6 kg) | 0.18% | Charged. Turned on vacuum. Then closed vacuum. Mixed at low speed all blades for 15 minutes. |
| | 2000 lbs. (900 kg) | 100.0% | |

Note:
Preheated the stainless steel vessel to 180° F. (82° C.). Maintained that temperature throughout the process. Vacuum applied was less than or equal to about 20 Torr.
[1]CERECHLOR S52, a 52% chlorine, long chain normal paraffin commercially available from ICI, Inc.
[2]PARAPLEX G-62, a high molecular weight soybean oil epoxide commercially available from Rohm and Haas.
[3]CHLORRZ 700-S, a 70% chlorine, long chain normal paraffin commercially available from Dover Chemical Company.
[4]commercially available from Columbia Carbon Company.
[5]commercially available from Specialty Metals Corporation.
[6]As described in Table 2 below.
[7]commercially available from Air Products Corporation.
[8]bis-oxazoladine, commercially available as HARDNER OZ from Bayer, Inc.

TABLE 2

ATMOSPHERIC CURING RESIN COMPOSITION

| MATERIAL | CHARGE WEIGHT | % WEIGHT | PROCEDURE |
|---|---|---|---|
| 1. PERMAPOL MS ®[1] | 950.0 lbs. (428 kg) | 58.3% | Charged. Mixed at low speed |
| 2. Organo Functional Silane #1[2] | 13.5 lbs. (6.0 kg) | 0.83% | Charged. |
| 3. Organo Functional Silane #2[3] | 13.5 lbs. (6.0 kg) | 0.83% | Charged. |
| 4. Talc | 652.0 lbs. (293 kg) | 40.0% | Charged one bag at a time. Turned on vacuum (less than or equal to about 20 Torr). Mixed to uniformity Moisture content tested. |
| | 1629.0 lbs. (733 kg) | 100.0% | |

[1]Commercially available from PRC DeSoto International, Inc.
[2]A-171 vinyltrimethoxysilane commercially available from OSI, Inc.
[3]A-187 glycidoxypropyltrimethoxysilane commercially available from OSI, Inc.

EXAMPLE 2

This example illustrates another suitable primary sealant composition of the invention and a method of making the same.

TABLE 3

| MATERIAL | CHARGE WEIGHT | % WEIGHT | PROCEDURE |
|---|---|---|---|
| 1. Chlorinated Plasticizer | 198.0 lbs. (89 kg) | 9.9% | Charged. Mixed at low speed. Saved 5 lbs (2.3 kg) for step 9. |
| 2. Polyisobutylene[1] | 640.0 lbs. (288 kg) | 32.0% | Charged. |
| 3. Solid Chlorinated Paraffin | 446.0 lbs. (201 kg) | 22.3% | Charged one bag at a time. Turned on disperser at medium speed. Continued mixing until the material became fluid. |
| 4. Carbon Black | 48.0 lbs. (22 kg) | 1.0% | Charged one bag at a time. |
| 5. Talc | 420.8 lbs. (189 kg) | 21.04% | Charged one bag at a time. Turned on vacuum. Mixed with low speed blades at low setting dispersion at medium speed for 30 minutes. |
| 6. Atmospheric Curing Resin Composition | 236.0 lbs. (106 kg) | 11.8% | Charged. Turned on vacuum. Mixed at low speed all blades for 15 minutes. Moisture content tested. |
| 7. Dibutyltin Dilaurate | 2.0 lbs. (0.9 kg) | 0.1% | Slurry with 5 lbs (2.3 kg) of chlorinated plasticizer from step 1. Turned on vacuum. |

TABLE 3-continued

| MATERIAL | CHARGE WEIGHT | % WEIGHT | PROCEDURE |
|---|---|---|---|
| 8. Accelerator | 3.6 lbs. (1.6 kg) | 0.18% | Charged. Turned on vacuum. Then closed vacuum. Mixed at low speed all blades for 15 minutes. |
| | 2001.0 lbs. (900 kg) | 100.0% | |

Note:
Preheated the stainless steel vessel to 180° F. (82° C.). Maintained that temperature throughout the process. The applied vacuum was less than or equal to about 20 Torr.
[1]Vistanex LM low molecular weight polyisobutylene commercially available from Exxon Corporation.

EXAMPLE 3

This Example illustrates a currently preferred primary sealant composition of the invention and method of making the same.

TABLE 4

| Material | Weight Percent | Procedure |
|---|---|---|
| Epoxidized soya plasticizer | 6.5 | Charged. |
| Drying oil[1] | 1.1 | Charged. |
| Phenolic modified drying oil[2] | 1.1 | Charged. |
| Amorphous polyolefin[3] | 11.6 | Charged slowly with mixer on and began heating to 210° F. (99° C.) with steam. |
| Ethylene Butyl Acrylate (EBA)[4] | 11.6 | Charged slowly with mixer on. |
| Wood rosin ester[5] | 28.1 | Charged slowly with mixer on. |
| titanium dioxide[6] | 2.1 | Charged. Mixed until material became fluid then turned off steam |
| Talc | 19.5 | Charged slowly with mixer on. After half charge pulled vacuum and mixed 10 minutes. Opened mixer and charged the remainder of the material. Mixed for 40 minutes under full vacuum. |
| Epoxidized soya plasticizer | 1 | Used for slurry with the next three raw materials |
| Organofuntional silane 3[7] | 0.5 | Mixed into slurry with previous raw material. |
| dibutyltin dilaurate | 0.07 | Mixed into slurry with previous raw materials. |
| Accelerator | 0.17 | Slurry with the previous raw materials then charged into the batch with the mixer on. Pulled vacuum and closed vacuum. Mixed under vacuum for 15 minutes. |
| Intermediate A[8] | 16.8 | Blended with the mixture above through processing equipment at 210° F. (99° C.) to 225° F. (107° C.) |

Note:
Vacuum used was less than or equal to about 20 Torr.
[1]Commercially available from Industrial Oil Company.
[2]Commercially available from HP Polymers Company.
[3]Commercially available from Huls Company.
[4]Commercially available from Elf Atochem.
[5]Commercially available from Arizona Chemical Company.
[6]Commercially available from E. I. duPont de Nemours and Company.
[7]mercaptopropyltrimethoxysilane commercially available from OSI.
[8]As described in Table 5 below.

TABLE 5

| | Intermediate A | |
|---|---|---|
| Material | Weight Percent | Procedure |
| PERMAPOL MS ® | 10.3 | Charged |
| Talc | 6.2 | Charged with mixer on |
| Carbon black | 0.034 | Charged with mixer on. Pulled full vacuum and mixed one hour. Maximum temp. 150° F. (66° C.) Sample to lab for water content. |
| Organofunctional silane 1 | 0.10 | Charged with mixer on. |
| Organofunctional silane 2 | 0.15 | Charged with mixer on. Pulled vacuum and close vacuum. Mixed for 20 minutes. |
| | 16.8 | |

Note:
Vacuum used was less than or equal to about 20 Torr.

COMPARATIVE EXAMPLE 4

Tests were conducted on primary sealant compositions formed in accordance with Example 3 above and Table 6 lists the test results (numerical average) for tests using the primary sealant composition of the invention versus those for a conventional polyisobutylene (PIB) primary sealant material commercially available from ADCO Products of Michigan City, Mich.

TABLE 6

| | PIB | Primary Sealant |
|---|---|---|
| MVT | 1.0 g/m$^2$/day | 1.95 g/m$^2$/day |
| Peel (Initial) | 5 lbs (2.3 kg) | 20 lbs (9 kg) |
| Peel (1 week) | 7 lbs (3 kg) | 25 lbs (11 kg) |
| Lap Shear (Initial) | 6 psi (0.4 kg/cm$^2$) | 8 psi (0.6 kg/cm$^2$) |
| Lap Shear (1 week) | 7 psi (0.5 kg/cm$^2$) | 15 psi (1.0 kg/cm$^2$) |
| Hardness (Initial) | 35 Shore A | 35 Shore A |
| Hardness (1 month) | 35 Shore A | 58 Shore A |
| H-Block (Initial) | 12.5 psi (0.9 kg/cm$^2$) | 14 psi (1.0 kg/cm$^2$) |
| H-Block (48 hours) | 13.7 psi (0.96 kg/cm$^2$) | 40 psi (2.8 kg/cm$^2$) |
| Modulus (Initial) | Not Measured | 30–35 psi (2.1–2.5 kg/cm$^2$) |
| Modulus (Cured) | 30 psi (2.1 kg/cm$^2$) (2.5–7 kg/cm$^2$) | 35–100 psi |

The values in Table 6 were based on a tested sealant thickness of 1.5 mm unless otherwise indicated below. For the values in Table 6, the moisture vapor transmission rate (MVT) was measured in accordance with ASTM F 1249. The peel strength values were measured in accordance with Sealed Insulating Glass Manufacturers Association (SIGMA) test method P.7.A using 3/16 inch (0.5 cm) by 1 inch (2.5 cm) by 5 inch (12.5 cm) glass pieces, a 0.010 inch (0.03 cm) by 1.0 inch (2.5 cm) steel strip; 0.060 inch (0.15 cm) thick sealant bead; and a crosshead speed of 2.0 inches per minute (5 cm/min). The lap shear strength values were determined using SIGMA test method P.6.A using 3/16 inch by 1 inch by 2 inch (0.5 cm by 2.5 cm by 5 cm) glass pieces; 0.060 inch (0.15 cm) sealant thickness; and a crosshead speed of 2.0 inches per minute (5 cm/min). The hardness was determined in accordance with SIGMA test procedure P.1.A. Initial Hardness Test. The H-block test was conducted by placing three wooden blocks between two 3/16 inch (0.5 cm) thick 2 inch by 2 inch (5 cm by 5 cm) glass pieces. The center block was ½ inch by ½ inch by 2 inch (1.3 cm by 1.3 cm by 5 cm). Adhesive tape was wrapped around the outside of the glass pieces to hold the blocks in place between the two glass pieces. Next, the center block was removed leaving a ½inch by ½ inch by 2 inch (1.3 cm by 1.3 cm by 5 cm) channel through the center of the structure. The primary sealant composition of Example 3 was extruded into this center channel slightly overfilling the channel. Excess material, i.e., material beyond the edges of the glass, was cut off and the sample was allowed to rest for one hour. The tape was removed and the remaining two wooden blocks taken out from between the glass sheets. This left the two 2 inch by 2 inch (5 cm by 5 cm) glass plates connected in their longitudinal centers by a ½ inch by ½ inch by 2 inch (1.3 cm by 1.3 cm by 5 cm) block of sealant material. The tensile strength was tested using a commercial tensile strength apparatus, commercially available from Instron, Inc., to pull the glass pieces apart at a crosshead speed of 2 inches per minute (5 cm/min). The values in Table 6 represent the load when the material failed. The modulus was determined in accordance with ASTM D412.

Thus, the present invention provides a sealant material which is particularly useful as a primary sealant for a dual-seal IG unit. As shown in Table 6, the primary sealant of the invention has a moisture vapor transmission rate (1.95 $g/m^2/day$) which is much lower than that of conventional thermoset materials (typically greater than 10 $g/m^2/day$) and is comparable to that of conventional PIB sealant (1.0 $g/m^2/day$). Additionally, the primary sealant of the invention has a higher modulus value (35–100 psi; 2.5–7 $kg/cm^2$) than conventional PIB (30 psi; 2.1 $kg/cm^2$), which promotes the structural integrity of the IG unit. However, the modulus value of the primary sealant material is generally less than that for conventional thermoset materials (typically greater than 200 psi; 14 $kg/cm^2$) so that the primary sealant of the invention will not be unduly stressed should the IG unit flex or twist during normal operation. Thus, the primary sealant of the invention provides a moisture vapor transmission rate comparable to that of a conventional thermoplastic material and also promotes the structural integrity of the IG unit.

It will be readily appreciated by those skilled in the art that modifications may be made to the invention without departing from the concepts disclosed in the foregoing description. Accordingly, the particular embodiments described in detail herein are illustrative only and are not limiting to the scope of the invention, which is to be given the full breadth of the appended claims and any and all equivalents thereof.

What is claimed is:

1. An insulating glass unit, comprising:

a first plane having an inner surface and an outer surface;

a second pane having an inner surface and an outer surface, the panes positioned such that the inner surface of the first pane faces the inner surface of the second pane;

a spacer located between the first and second panes; and a sealant system adhering the panes to the spacer, the sealant system comprising:

(a) a first sealant comprising:

a thermoplastic resin component, wherein the thermoplastic component comprises a mixture of epoxidized soya plasticizers, ethylene butylacrylate, and a polyolefin; and a curable resin component; and (b) a second sealant located adjacent the first sealant, wherein the first sealant, upon curing, has a moisture vapor transmission rate of less than about 2.5 $g/m^2/day$ and a hardness after curing ranging from about 30 Shore A to about 50 Shore A.

2. An insulating glass unit, comprising:

a first pane of glass;

a second pane of glass;

a spacer system comprising (i) a spacer positioned between an inner surface of the first pane of glass and an inner surface of the second pane of glass, and (ii) a sealant system for adhering the inner surfaces of the panes to the spacer, the sealant system comprising:

at least one sealant, comprising:

(a) at least one thermoplastic hot-melt material having a melt temperature ranging from about 125° F. (51° C.) to about 250° F. (121° C.), wherein the thermoplastic hot-melt material comprises a mixture of an epoxide material, an acrylate material, and a polyolefin material; and (b) at least one curable material, wherein the sealant, when cured, forms a covalent bond between the spacer and the panes, and wherein the sealant has an initial hardness ranging from about 25 Shore A to about 45 Shore A and a post-cure hardness measured about 48 hours thereafter ranging from about 30 Shore A to about 50 Shore A.

3. The insulating glass unit as claimed in claim 2, wherein the thermoplastic hot-melt material comprises a mixture of epoxidized soya plasticizer, ethylene butylacrylate, and amorphous polyolefin.

* * * * *